(12) United States Patent
Wang et al.

(10) Patent No.: US 11,445,496 B2
(45) Date of Patent: Sep. 13, 2022

(54) RESOURCE DETERMINING METHOD AND APPARATUS

(71) Applicant: Huawei Technologies Co., Ltd., Shenzhen (CN)

(72) Inventors: Yafei Wang, Shanghai (CN); Xiaojun Ma, Shenzhen (CN); Zhang Zhang, Shanghai (CN); Chi Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 17/037,154

(22) Filed: Sep. 29, 2020

(65) Prior Publication Data

US 2021/0014843 A1    Jan. 14, 2021

Related U.S. Application Data

(63) Continuation of application No. PCT/CN2019/080666, filed on Mar. 29, 2019.

(30) Foreign Application Priority Data

Mar. 30, 2018 (CN) .......................... 201810276348.1

(51) Int. Cl.
*H04W 72/04* (2009.01)
*H04W 4/40* (2018.01)

(52) U.S. Cl.
CPC ........... *H04W 72/044* (2013.01); *H04W 4/40* (2018.02); *H04W 72/042* (2013.01)

(58) Field of Classification Search
CPC . H04W 72/042; H04W 72/044; H04W 76/14; H04W 72/04; H04W 72/0446; H04W 4/40; H04W 4/44; H04W 4/46; H04W 72/02; H04W 72/0453; H04L 5/00; H04L 1/00

See application file for complete search history.

(56) References Cited

U.S. PATENT DOCUMENTS

2012/0183295 A1    7/2012   Chang
2017/0141838 A1    5/2017   Chang
(Continued)

FOREIGN PATENT DOCUMENTS

CN    1780179 A    5/2006
CN    102056238 A    5/2011
(Continued)

OTHER PUBLICATIONS

"RAN1 Chairman's Notes," 3GPP TSG RAN WG1 Meeting NR#3, Nagoya, Japan, 63 pages, 3rd Generation Partnership Project, Valbonne, France (Sep. 18-21, 2017).
(Continued)

*Primary Examiner* — Maharishi V Khirodhar
*Assistant Examiner* — Kenneth P Hunt
(74) *Attorney, Agent, or Firm* — Leydig, Voit & Mayer, Ltd.

(57) ABSTRACT

This application discloses a resource determining method and an apparatus. In the method, a terminal obtains first indication information and second indication information, where the first indication information is used to indicate a slot in which the terminal sends or receives an SA, and the second indication information is used to indicate a slot format of the slot; and the terminal determines SA resources in the slot based on the slot format.

20 Claims, 11 Drawing Sheets

31

A terminal obtains first indication information and second indication information, where the first indication information is used to indicate a slot in which the terminal sends or receives an SA, and the second indication information is used to indicate a slot format of the slot

32

The terminal determines SA resources in the slot based on the slot format

(56) References Cited

U.S. PATENT DOCUMENTS

| | | | | |
|---|---|---|---|---|
| 2020/0045697 | A1* | 2/2020 | Choi | H04W 72/042 |
| 2021/0329498 | A1* | 10/2021 | Tang | H04W 28/18 |
| 2021/0329650 | A1* | 10/2021 | Zhang | H04W 72/042 |

FOREIGN PATENT DOCUMENTS

| | | |
|---|---|---|
| CN | 103457694 A | 12/2013 |
| CN | 104170504 A | 11/2014 |
| CN | 107592155 A | 1/2018 |
| CN | 107770865 A | 3/2018 |
| CN | 107819557 A | 3/2018 |
| EP | 2941006 A1 | 11/2015 |
| WO | 2018010125 A1 | 1/2018 |

OTHER PUBLICATIONS

"3rd Generation Partnership Project;Technical Specification Group Radio Access Network;Evolved Universal Terrestrial Radio Access (E-UTRA);Physical layer procedures(Release 15)," 3GPP TS 36.213 V15.0.0, 493 pages, 3rd Generation Partnership Project, Valbonne, France (Dec. 2017).

"Initial views on frame structure for NR access technology," 3GPP TSG RAN WG1 Meeting #84bis, Busan, Korea, R1-163112, 7 pages, 3rd Generation Partnership Project, Valbonne, France (Apr. 11-15, 2016).

Qualcomm Incorporated, "Remaining issues on slot format indication," 3GPP TSG RAN WG1 #90bis Prague, Czech Republic, R1-1718556, total 12 pages, 3rd Generation Partnership Project, Valbonne, France (Oct. 9-13, 2017).

Samsung, "Functionalities of UE-Common PDCCH," 3GPP TSG RAN WG1 NR ad-Hoc#2, Qingdao, China, R1-1710698, total 5 pages, 3rd Generation Partnership Project, Valbonne, France (Jun. 27-30, 2017).

Sharp, "Consideration of SA Resource Index Design in D2D Grant," 3GPP TSG RAN WG1 Meeting #78bis, Ljubljana, Slovenia, R1-143794, total 3 pages, 3rd Generation Partnership Project, Valbonne, France (Oct. 6-10, 2014).

Lenovo, "Mechanisms for V2V resource allocation," 3GPP TSG RAN WG1 Meeting #84,St. Julian's, Malta, R1-161014, total 7 pages, 3rd Generation Partnership Project, Valbonne, France (Feb. 15-19, 2016).

\* cited by examiner

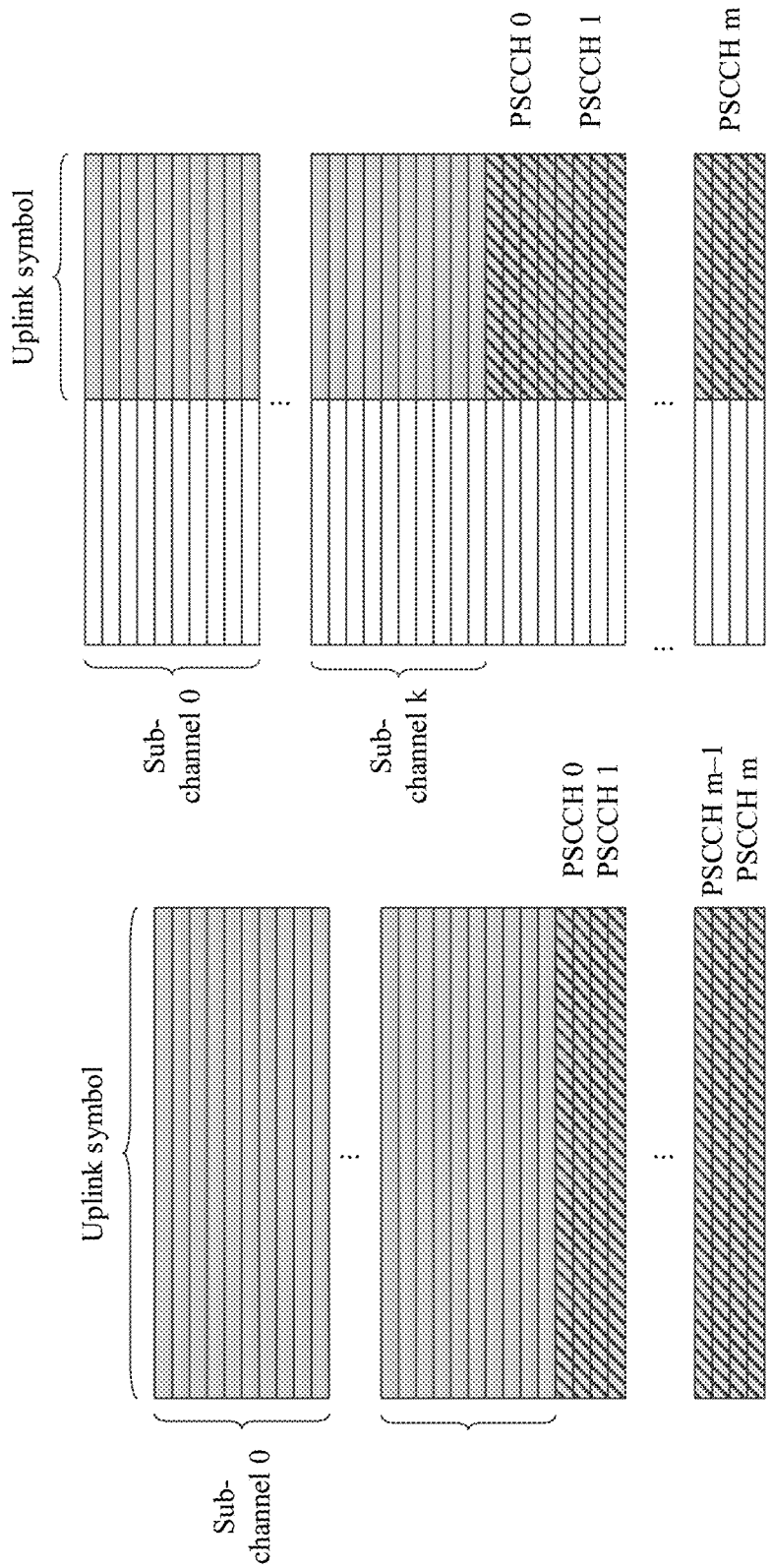

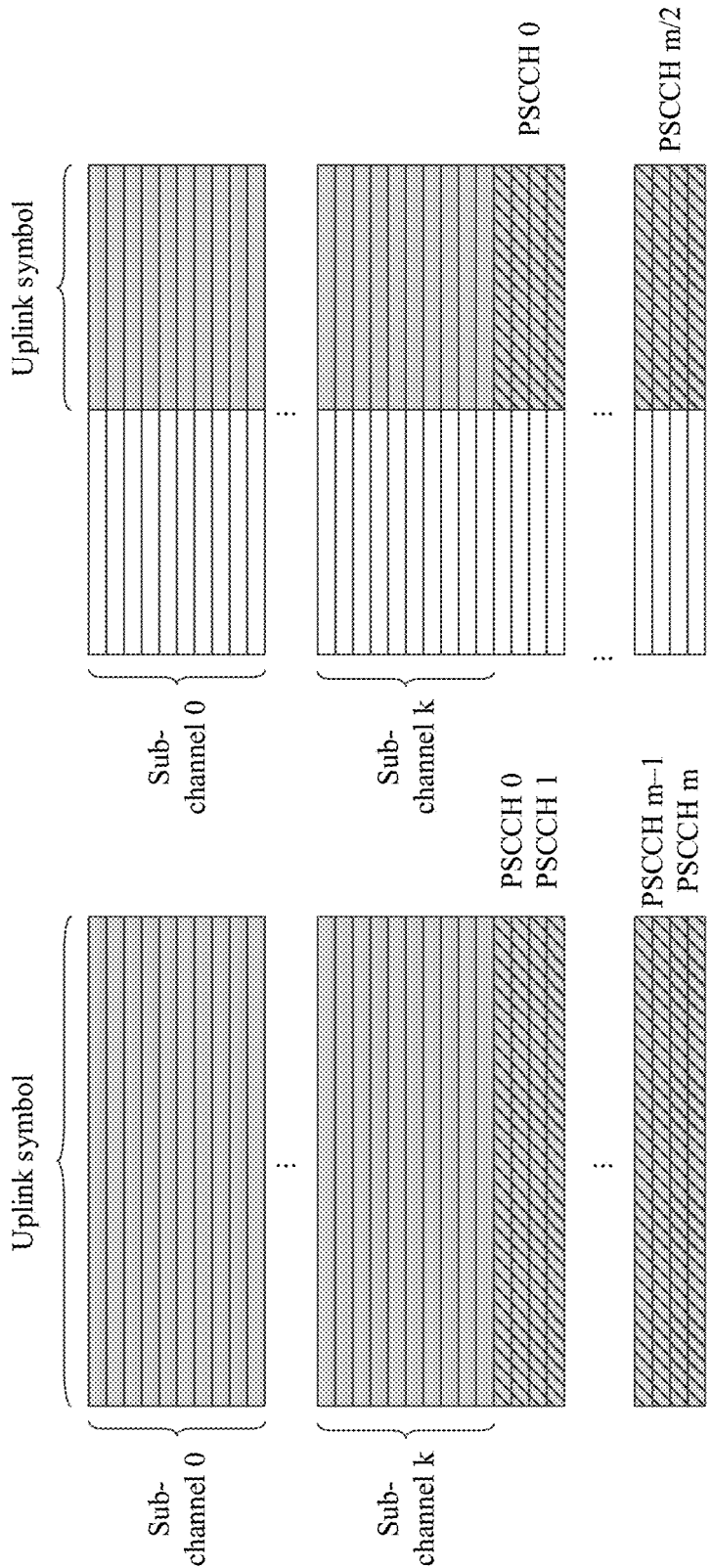

RESOURCE DETERMINING METHOD AND APPARATUS

CROSS-REFERENCE TO RELATED APPLICATIONS

This application is a continuation of International Application No. PCT/CN2019/080666, filed on Mar. 29, 2019, which claims priority to Chinese Patent Application No. 201810276348.1, filed on Mar. 30, 2018. The disclosures of the aforementioned applications are hereby incorporated by reference in their entireties.

TECHNICAL FIELD

This application relates to the field of communications technologies, and in particular, to a resource determining method and an apparatus.

BACKGROUND

Vehicle to everything (V2X) is a key technology of a future intelligent transportation system. Application of the V2X may include vehicle to vehicle (V2V), vehicle to infrastructure (V2I), vehicle to pedestrian (V2P), and vehicle to application server (V2N). In the application of V2X, driving safety can be improved, congestion and vehicle energy consumption can be reduced, traffic efficiency can be improved, in-vehicle entertainment information can be increased, and so on.

In the application of V2X, during communication between terminals, a transmit end sends a scheduling assignment (SA) on a physical sidelink control channel (PSCCH) to dynamically indicate data transmission resources that are selected and occupied, and a receive end obtains transmitted data on resources indicated by the SA.

Both time domain resources and frequency domain resources that are used by the terminal to transmit the SA may be indicated by a base station by using dynamic signaling or physical layer signaling, or may be semi-statically configured by a base station. If both the time domain resources and the frequency domain resources are indicated by using the dynamic signaling or the physical layer signaling, the base station sends indication information of the time domain resources and indication information of the frequency domain resources to the terminal; and the transmit end and the receive end determine, based on the indication information, the time domain resources and the frequency domain resources that are configured by the base station. If SA resources are semi-statically configured by the base station, the terminal determines, based on an indication of the base station, a slot in which the SA is transmitted; the transmit end selects the SA resources from resources that can be used to transmit the SA in the slot, that is, from a candidate SA resource pool, and sends the SA; and the receive end performs blind detection on resources included in the candidate SA resource pool in the slot, to receive the SA.

However, time domain resource allocation in a 5th generation (5G) mobile communications technology is more flexible and variable than that in long term evolution (LTE) system. When the SA is configured on flexible time domain resources, SA frequency domain resources cannot be determined according to the prior art. Therefore, a method for determining SA resources by a terminal in LTE is not applicable to a 5G communications system.

SUMMARY

Embodiments of this application provide a resource determining method and an apparatus, to resolve a problem of determining SA resources in a scenario in which a slot is flexible and variable.

According to a first aspect, an embodiment of this application provides a resource determining method, including:

obtaining, by a terminal, first indication information and second indication information, where the first indication information is used to indicate a slot in which the terminal sends or receives an SA, and the second indication information is used to indicate a slot format of the slot; and determining, by the terminal, SA resources in the slot based on the slot format.

In an embodiment, the slot format is specifically used to indicate symbols in the slot that are used for uplink transmission and symbols in the slot that are used for downlink transmission.

In LTE, all symbols in each slot are used for uplink transmission or all symbols in each slot are used for downlink transmission. Therefore, a method for determining SA resources by a terminal in LTE cannot be used in a communications system in which a slot format is flexible and variable. In the foregoing method, the terminal determines the SA resources based on the slot format, so that the method is applicable to the communications system in which a slot format is flexible and variable.

In a possible implementation, when determining the SA resources in the slot based on the slot format, the terminal may determine SA frequency domain resources in the slot. Specifically, the terminal occupies an uplink symbol to transmit the SA, and a base station sends, to the terminal, the slot in which the SA is transmitted and the slot format of the slot. That is, the base station notifies the terminal of time domain resources used to transmit the SA. Therefore, the terminal may further determine, based on the slot format, the frequency domain resources used to transmit the SA, to determine the resources used to transmit the SA.

In a possible implementation, when determining the SA frequency domain resources based on the slot format, the terminal may first determine a first quantity based on the slot format, where the first quantity is a quantity of resource blocks (resource block, RB) occupied by the SA in frequency domain; and the terminal determines the SA frequency domain resources based on the first quantity.

In the foregoing embodiment, the first quantity is related to the slot format, and the frequency domain resources used to transmit the SA is related to the first quantity, so that the terminal can determine the frequency domain resources used to transmit the SA, based on a relationship between the first quantity and the slot format and a relationship between the frequency domain resources used to transmit the SA and the first quantity.

In a possible implementation, when determining the first quantity based on the slot format, the terminal may determine a quantity (namely, a second quantity) of uplink symbols in the slot based on the slot format, and then determine the first quantity based on the second quantity and a mapping relationship between the second quantity and the first quantity.

The slot format may indicate symbols in the slot that are used for uplink transmission and symbols in the slot that are used for downlink transmission. Therefore, the terminal may determine the quantity of uplink symbols based on an indication of the slot format. However, in the foregoing embodiment, there is a given mapping relationship between the second quantity and the first quantity. The mapping relationship may be a mapping table, and the terminal may search the mapping table for the corresponding first quantity based on the second quantity. The mapping relationship may alternatively be a mapping function, and the terminal may calculate the first quantity based on the second quantity by using the mapping function.

In a possible implementation, when the terminal determines the first quantity based on the mapping relationship between the second quantity and the first quantity, if the second quantity is greater than or equal to a preset threshold, the terminal may determine the first quantity according to the following formula:

$$y = \left\lfloor \frac{A}{x} \right\rfloor,$$

where x represents the second quantity, y represents the first quantity, A is a constant, and $\lfloor \ \rfloor$ represents rounding down.

In a possible implementation, when determining the SA frequency domain resources in the slot, the terminal may first determine a set of the SA resources in the slot, and then selects, from the set of the SA resources, frequency domain resources used to send the SA, or determines resources in the set of the SA resources as resources used to detect the SA.

If the base station indicates only the slot in which the terminal transmits the SA, and does not indicate a frequency domain resource, the terminal may determine, in the slot, a set of candidate resources that can be used to transmit the SA. If the terminal is a transmit end for data transmission, the terminal further selects, from the determined resource set, the frequency domain resource used to send the SA. For example, the terminal may randomly select the frequency domain resource or select the frequency domain resource according to a preset rule. If the terminal is a receive end for data transmission, the terminal performs blind detection on the determined resource set, to detect whether the transmit end sends the SA.

In a possible implementation, when determining the set of the SA resources in the slot, the terminal may determine an RB included in an $m^{th}$ available resource in the slot according to the following formula:

$$n_{RB} = n_{CHRBstart} + m \times n_{CHsize} + j, j = 0, 1, \ldots y-1, \text{ where}$$

$n_{RB}$ represents a number of the RB in frequency domain, $n_{CHRBstart}$ represents a number of a starting RB of a sub-channel in frequency domain, $n_{CHsize}$ represents a quantity of RBs included in the sub-channel in frequency domain, m is an integer greater than or equal to 0, and y represents the first quantity.

The foregoing embodiment may be applied to a case in which a resource occupied to transmit an SA and resources occupied by data scheduled by the SA are continuous in frequency domain.

In a possible implementation, when determining the set of the SA resources in the slot, the terminal may determine an RB included in $m^{th}$ available resources in the slot according to the following formula:

$$n_{RB} = n_{CHRBstart} + n \times n_{CHsize} + j$$

$$n = k*m, k*m+1, \ldots, k*m+k-1, k = \left\lfloor \frac{y}{2} \right\rfloor$$

$$j = 0, 1,$$

where $n_{RB}$ represents a number of the RB in frequency domain, $n_{CHRBstart}$ represents a number of a starting RB of a sub-channel in frequency domain, $n_{CHsize}$ represents a quantity of RBs included in the sub-channel in frequency domain, m is an integer greater than or equal to 0, and y represents the first quantity.

The foregoing embodiment may also be applied to a case in which resources occupied to transmit an SA and resources occupied by data scheduled by the SA are continuous in frequency domain.

In a possible implementation, when determining the set of the SA resources in the slot, the terminal may determine an RB included in $m^{th}$ available resources in the slot according to the following formula:

$$n_{RB} = n_{PSCCHstart} + y \times m + j, j = 0, 1, \ldots y-1, \text{ where}$$

$n_{RB}$ represents a number of the RB in frequency domain, $n_{PSCCHstart}$ represents a number of a starting RB of resources that can be used to transmit the SA, m is an integer greater than or equal to 0, and y represents the first quantity.

The foregoing embodiment may be applied to a case in which resources occupied to transmit an SA and resources occupied by data scheduled by the SA are discontinuous in frequency domain.

In a possible implementation, the method further includes: obtaining, by the terminal, third indication information, where the third indication information is used to indicate that the SA frequency domain resources are $m^{th}$ available resources in the slot; and determining, by the terminal, an RB included in the $m^{th}$ available resources in the slot according to the following formula:

$$n_{RB} = n_{CHRBstart} + m \times n_{CHsize} + j,$$

$$j = 0, 1, \ldots y-1; \text{ or}$$

$$n_{RB} = n_{CHRBstart} + n \times n_{CHsize} + j,$$

$$n = k*m, k*m+1, \ldots, k*m+k-1,$$

$$k = \left\lfloor \frac{y}{2} \right\rfloor, j = 0, 1; \text{ or}$$

$$n_{RB} = n_{PSCCHstart} + y \times m + j, j = 0, 1, \ldots y-1,$$

where $n_{RB}$ represents a number of the RB in frequency domain, $n_{PSCCHstart}$ represents a number of a starting RB of resources that can be used to transmit the SA, $n_{CHsize}$ represents a quantity of RBs included in a sub-channel in frequency domain, and y represents the first quantity.

In the foregoing embodiment, the terminal determines the SA frequency domain resources based on a value of m indicated by a network device, and does not need to determine the set of the SA resources.

In a possible implementation, the terminal may further determine, only when the quantity of uplink symbols in the slot is greater than or equal to the preset threshold, the resources used to transmit the SA in the slot.

If there is no uplink symbol in the slot or there are an excessively small quantity of uplink symbols in the slot, no SA may be transmitted or transmission reliability is relatively poor. In this case, the terminal cancels transmission of the SA in the slot. If the quantity of uplink symbols is greater than or equal to the preset threshold, the terminal may determine to transmit the SA in the slot, and further determine the resources used to transmit the SA in the slot.

In a possible implementation, the mapping relationship may be pre-agreed, or may be semi-statically configured by the base station.

According to a second aspect, an embodiment of this application provides a resource determining method, including:

obtaining, by a terminal, first indication information and second indication information, where the first indication information is used to indicate a slot in which the terminal sends or receives an SA, and the second indication information is used to indicate a slot format of the slot; determining, by the terminal based on the slot format, a format of sidelink control information (sidelink control information, SCI) carried in the SA in the slot, where different formats correspond to different quantities of bits occupied by the SCI; and sending or detecting, by the terminal, the SA based on the format of the SCI.

In the foregoing embodiment, a method for determining, by a terminal based on a slot indicated by a base station and a slot format of the slot, time domain resources and frequency domain resources that are used to transmit an SA may be similar to that in the prior art. However, in the foregoing method, different slot formats may indicate different determined quantities of RBs occupied by resources used to transmit the SA. To ensure that all the resources including different determined quantities of RBs can be used to transmit the SA, the SCI may be transmitted by using different quantities of bits.

In a possible implementation, when determining the format of the SCI based on the slot format, the terminal may first determine a quantity of uplink symbols in the slot based on the slot format, and then determine, based on the quantity of uplink symbols, the format of the SCI carried in the SA transmitted in the slot.

In the foregoing embodiment, there is a correspondence between the quantity of uplink symbols in the slot and the format of the SCI. For example, a relatively large quantity of uplink symbols in the slot indicates a relatively large quantity of bits occupied by the SCI; or a relatively small quantity of uplink symbols in the slot indicates a relatively small quantity of bits occupied by the SCI.

According to a third aspect, an embodiment of this application provides a resource configuration method, including:

sending, by a network device, first indication information and second indication information, where the first indication information is used to indicate a slot in which a terminal sends or receives a scheduling assignment SA, and the second indication information is used to indicate a slot format of the slot, so that the terminal determines SA resources in the slot based on the slot format.

In a possible implementation, the method further includes: determining, by the network device, SA frequency domain resources in the slot based on the slot format; and sending, by the network device, third indication information to the terminal, where the third indication information is used to indicate the SA frequency domain resources.

In a possible implementation, the determining, by the network device, SA frequency domain resources in the slot based on the slot format further includes: determining, by the network device, a first quantity based on the slot format, where the first quantity is a quantity of resource blocks RBs occupied by the SA in frequency domain; and determining, by the network device, the SA frequency domain resources in the slot based on the first quantity.

In a possible implementation, the determining, by the network device, a first quantity based on the slot format includes: determining, by the network device, a second quantity based on the slot format, where the second quantity is a quantity of uplink symbols in the slot; and determining, by the network device, the first quantity based on a mapping relationship between the second quantity and the first quantity.

In a possible implementation, the determining, by the network device, the first quantity based on a mapping relationship between the second quantity and the first quantity includes: if the second quantity is greater than or equal to a preset threshold, determining the first quantity according to the following formula:

$$y = \left\lfloor \frac{A}{x} \right\rfloor,$$

where x represents the second quantity, y represents the first quantity, A is a constant, and $\lfloor \ \rfloor$ represents rounding down.

In a possible implementation, the third indication information is used to indicate that the SA frequency domain resources are an $m^{th}$ available resources in the slot, and an RB included in the $m^{th}$ available resources is as follows:

$n_{RB} = n_{CHRBstart} + m \times n_{CHsize} + j$, $j = 0, 1, \ldots y-1$, where $n_{RB}$ represents a number of the RB in frequency domain, $n_{CHRBstart}$ represents a number of a starting RB of a sub-channel in frequency domain, $n_{CHsize}$ represents a quantity of RBs included in the sub-channel in frequency domain, and y represents the first quantity.

In a possible implementation, the third indication information is used to indicate that the SA frequency domain resources are $m^{th}$ available resources in the slot, and an RB included in the $m^{th}$ available resources is as follows:

$$n_{RB} = n_{CHRBstart} + n \times n_{CHsize} + j$$
$$n = k*m, k*m+1, \ldots, k*m+k-1, k = \left\lfloor \frac{y}{2} \right\rfloor$$
$$j = 0, 1,$$

where $n_{RB}$ represents a number of the RB in frequency domain, $n_{CHRBstart}$ represents a number of a starting RB of a sub-channel in frequency domain, $n_{CHsize}$ represents a quantity of RBs included in the sub-channel in frequency domain, m is an integer greater than or equal to 0, and y represents the first quantity.

In a possible implementation, the third indication information is used to indicate that the SA frequency domain resources is an $m^{th}$ available resources in the slot, and an RB included in the $m^{th}$ available resources is as follows:

$n_{RB} = n_{PSCCHstart} + y \times m + j$, $j = 0, 1, \ldots y-1$, where $n_{RB}$ represents a number of the RB in frequency domain, $n_{PSCCHstart}$ represents a number of a starting RB of resources that can be used to transmit the SA, and y represents the first quantity.

In a possible implementation, the method further includes: sending, by the network device, a mapping relationship between a first quantity and a second quantity to the terminal, where the first quantity is a quantity of resource blocks RBs occupied by the SA in frequency domain, and the second quantity is a quantity of uplink symbols in the slot.

According to a fourth aspect, an embodiment of this application provides a communications device, including a processor, a memory, and a communications interface. The memory is configured to store a program. The processor invokes the program stored in the memory, to perform the method according to any one of the possible implementations of the first aspect by using the communications interface.

According to a fifth aspect, an embodiment of this application provides a communications device, including a processor, a memory, and a communications interface. The memory is configured to store a program. The processor invokes the program stored in the memory, to perform the method according to any one of the possible implementations of the second aspect by using the communications interface.

According to a sixth aspect, an embodiment of this application provides a communications device, including a processor, a memory, and a communications interface. The memory is configured to store a program. The processor invokes the program stored in the memory, to perform the method according to any one of the possible implementations of the third aspect by using the communications interface.

According to a seventh aspect, an embodiment of this application provides a communications system, including the communications device according to the fourth aspect and the communications device according to the fifth aspect, or including the communications device according to the fifth aspect and the communications device according to the sixth aspect.

According to an eighth aspect, an embodiment of this application provides a storage medium. The storage medium stores a computer program, and the computer program is executed by a processor, to implement the method according to any one of the first aspect to the third aspect.

According to a ninth aspect, an embodiment of this application provides a chip system, including a processor, configured to support a communications device in implementing the method according to any one of the first aspect to the third aspect.

BRIEF DESCRIPTION OF DRAWINGS

FIG. 9(a) and FIG. 9(b) are third schematic diagrams of SA resources according to an embodiment of this application;

FIG. 10(a) and FIG. 10(b) are fourth schematic diagrams of SA resources according to an embodiment of this application;

DESCRIPTION OF EMBODIMENTS

To make objectives, technical solutions, and advantages of this application clearer, the following further describes this application in detail with reference to accompanying drawings.

Figure 1:
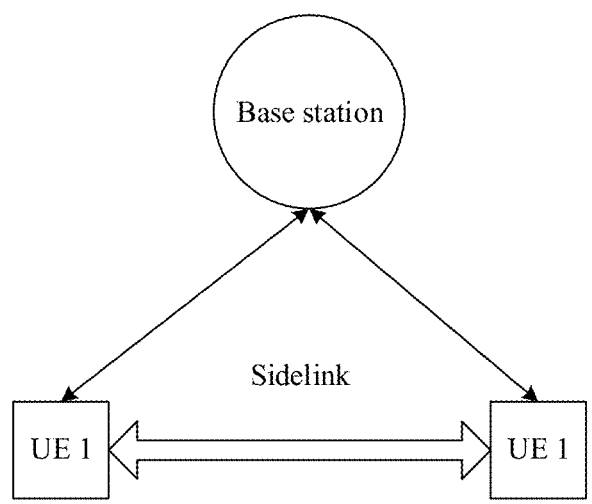
FIG. 1 is a schematic diagram of a V2X network architecture according to an embodiment of this application.

FIG. 1 is a schematic diagram of a network architecture for communication between terminals in a V2X application scenario according to an embodiment. A terminal 1 and a terminal 2 communicate with each other by using a sidelink, and sidelink resources may be determined based on an indication of a network device such as a base station. For example, if the terminal 1 needs to send data to the terminal 2, the terminal 1 serves as a transmit end, and sends an SA on a PSCCH to dynamically indicate occupied data transmission resources; and the terminal 2 serves as a receive end, and obtains, on resources indicated by the SA, the data sent by the terminal 1.

The base station in embodiments of this application may be configured to mutually convert a received over-the-air frame and an Internet Protocol (IP) packet, and is used as a router between a wireless terminal and a remaining part of an access network, where the remaining part of the access network may include an IP network. The base station may further be configured to coordinate attribute management of an air interface. In a communications system using different radio access technologies, a device having a base station function may have different names. For example, a base station in a global system for mobile communications (GSM) or a code division multiple access (CDMA) system is referred to as a base transceiver station (BTS). A base station in a wideband code division multiple access (WCDMA) system is referred to as a NodeB (node B). A base station in an LTE system is referred to as an evolved NodeB (eNB). A base station in an NR system is referred to as a general NodeB (gNB). This is not limited in the embodiments of this application.

The terminal in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network ( ) or the like. This is not limited in the embodiments of this application.

Generally, SA resources are not fixed. SA time domain resources and SA frequency domain resources may be separately configured by the base station. Alternatively, the base station may indicate only the SA time domain resources, and the SA frequency domain resources are selected by the transmit end.

Figure 2A:
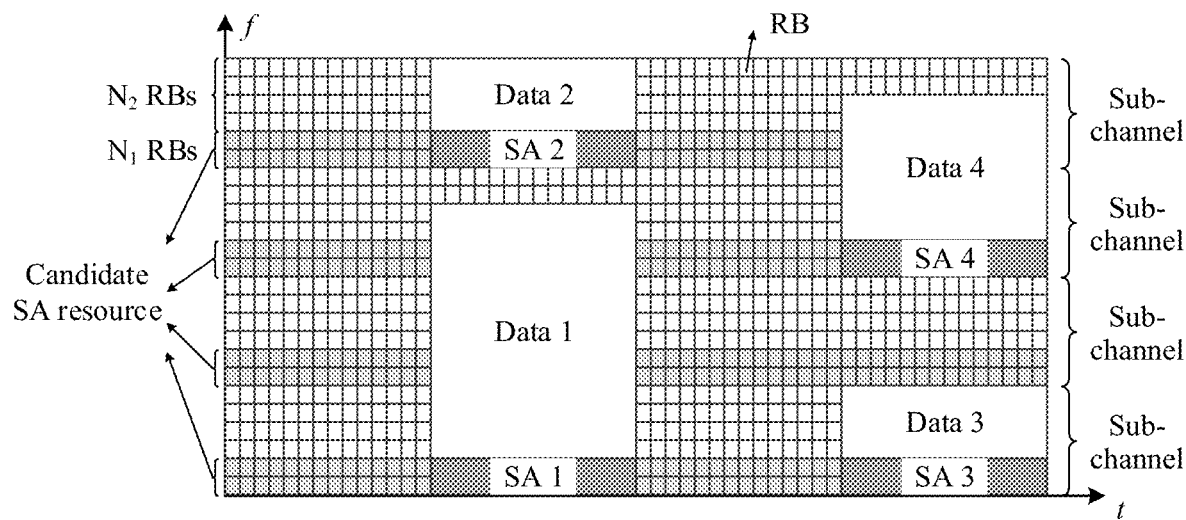
FIG. 2(a) and FIG. 2(b) are schematic diagrams of resource distribution of SA resources and data scheduled by an SA according to an embodiment of this application.
Figure 2B:
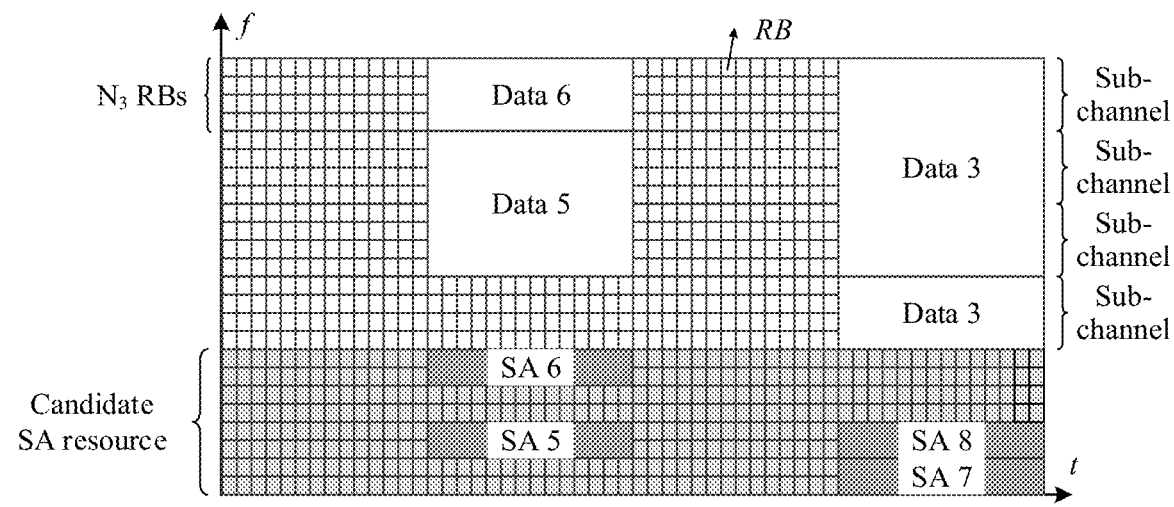

Distribution of the SA resources and data transmission resources includes two cases shown in FIG. 2(a) and FIG. 2(b).

FIG. 2(a) shows a case in which SA resources (because a PSCCH can be used to carry an SA, resources that can be occupied by the PSCCH is resources that can be occupied by the SA) and resources occupied by data scheduled by the SA are continuous in frequency domain. For example, frequency domain resources in which an SA 1 is located and resources in which data Data 1 scheduled by the SA 1 is located are continuous in frequency domain. Frequency domain resources in which an SA 2 is located and resources in which data Data 2 scheduled by the SA 2 is located are continuous in frequency domain. Frequency domain resources in which an SA 3 is located and resources in which data Data 3 scheduled by the SA 3 is located are continuous in frequency domain. Frequency domain resources in which an SA 4 is located and resources in which data Data 4 scheduled by the SA 4 is located are continuous in frequency domain. As shown in FIG. 2(a), a sub-channel includes SA resources including $N_1$ RBs and data resources including $N_2$ RBs in frequency domain, where $N_1$ and $N_2$ are preset positive integers. SA resources part can be used to transmit an SA, and can also be used to transmit data (for example, resources occupied by the Data 1 includes a part of the SA resources). A data resources part can be used to transmit data, but cannot be used to transmit an SA.

FIG. 2(b) shows a case in which SA resources and resources occupied by data scheduled by an SA are discontinuous in frequency domain. As shown in the figure, resources that can be used to transmit SAs are relatively centralized in frequency domain, and cannot be used to transmit data. Resources that can be used to transmit data are relatively centralized in frequency domain, and cannot be used to transmit SAs. A sub-channel includes $N_3$ RBs in frequency domain, where $N_3$ is a preset positive integer.

The SA resources are uplink transmission resources. In the prior art, all symbols included in one subframe are used for uplink transmission, or all symbols included in one subframe are used for downlink transmission. Therefore, a base station usually indicates, in a unit of a subframe, time domain resources that are used by a terminal to send or receive an SA.

In a 5th generation (5G) mobile communications technology, a slot is used as a unit for data transmission in replacement of the subframe. However, in 5G, the slot has a flexible and diversified structure. For example, several symbols included in one slot may be all used for uplink transmission, or may be all used for downlink transmission. Alternatively, some symbols may be used for uplink transmission, some symbols may be used for downlink transmission, and some symbols may further be set as unknown symbols. To be specific, the unknown symbols may be used for uplink or downlink transmission based on a scheduling assignment of the base station. If the base station does not perform scheduling assignment on the unknown symbols, the unknown symbols are usually used for neither uplink transmission nor downlink transmission. A slot format may represent various possible combinations of an uplink symbol, a downlink symbols, and an unknown symbol.

Therefore, a method for determining SA resources by a terminal in LTE is not applicable to a 5G communications system, and how the terminal determines the SA resources becomes a problem that needs to be urgently resolved.

Therefore, the embodiments of this application provide a resource determining method and an apparatus, to resolve a problem of determining SA resources in a scenario in which a slot is flexible and variable.

Figure 3:
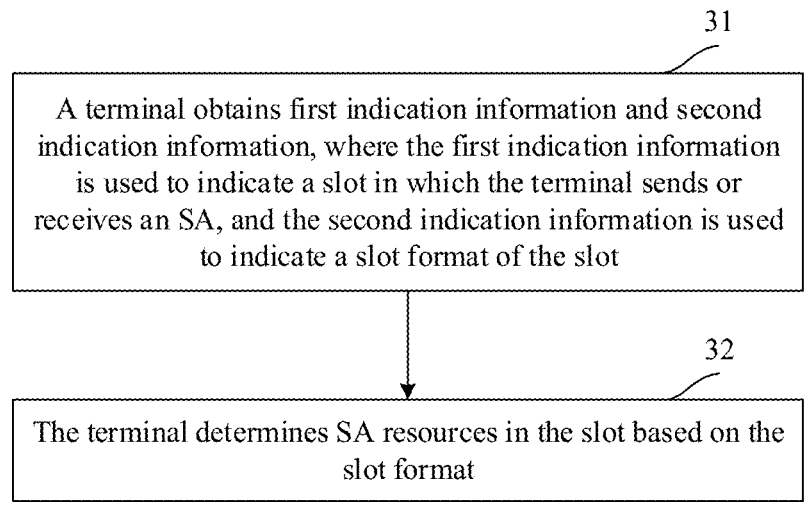
FIG. 3 is a first schematic flowchart of a resource determining method according to an embodiment of this application.

FIG. 3 is a schematic flowchart of a resource determining method according to an embodiment of this application. The method may be applied to a data transmit end, or may be applied to a data receive end. As shown in figure, the method may include the following steps.

Step 31: A terminal obtains first indication information and second indication information.

The first indication information is used to indicate a slot in which the terminal sends or receives an SA, and the second indication information is used to indicate a slot format of the slot.

Optionally, the first indication information may be carried in downlink control information (DCI), to indicate time domain resources used by the terminal to send or receive the SA. Specifically, a base station sends, on a physical downlink control channel (PDCCH), the DCI that carries the first indication information. The terminal receives the DCI, to obtain the time domain resources used to send or receive the SA.

Optionally, the second indication information may be slot format indication information (slot format information, SFI). Specifically, the terminal may receive, on a group common physical downlink control channel (group common PDCCH), the SFI sent by the base station, to obtain the slot format of the slot that is indicated by the first indication information and in which the SA is sent or received. For example, a plurality of combinations of an uplink symbol, a downlink symbol, and an unknown symbol in the slot may be pre-numbered. The base station may send a slot format number to the terminal. The terminal may determine, based on the slot format number, whether each slot symbol in the slot is an uplink symbol, a downlink symbol, or an unknown symbol.

Step 32: The terminal determines SA resources in the slot based on the slot format.

The terminal may determine, based on the slot format obtained from second indication information, symbols, in the slot that is indicated by the first indication information and in which the SA is sent or received, that are used for uplink transmission, that is, determine symbols in the slot that are used to send or receive the SA.

It needs to be understood that, in the descriptions of this application, words such as "first" and "second" are merely used for distinction and description, and shall not be understood as an indication or implication of relative importance or an indication or implication of an order.

In the foregoing method embodiment, the terminal determines the SA resources based on the slot format, so that the method is applicable to a communications system in which a slot format is flexible and variable.

The terminal may directly determine, based on the first indication information and the second indication information, the time domain resources used to send or receive the SA. In addition, the terminal may further determine, based on the slot format, frequency domain resources that are in the slot and that is used to send or receive the SA.

Figure 4:
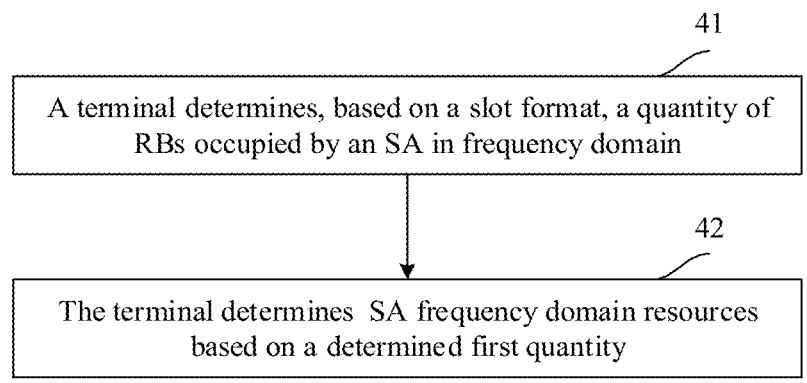
FIG. 4 is a second schematic flowchart of a resource determining method according to an embodiment of this application.

In a possible implementation, when determining, based on the slot format, the frequency domain resources that are in the slot indicated by the first indication information and that is used to send or receive the SA, the terminal may determine SA frequency domain resources by performing a procedure shown in FIG. 4.

Step 41: The terminal determines, based on the slot format, a quantity of RBs occupied by the SA in frequency domain.

For ease of description, "first quantity" is used below to indicate the quantity of RBs occupied by the SA in frequency domain.

Step 42: The terminal determines the SA frequency domain resources based on the determined first quantity.

In the foregoing embodiment, the first quantity is related to the slot format. For example, SAs sent in slots having different slot formats may occupy different quantities of RBs.

Figure 5:
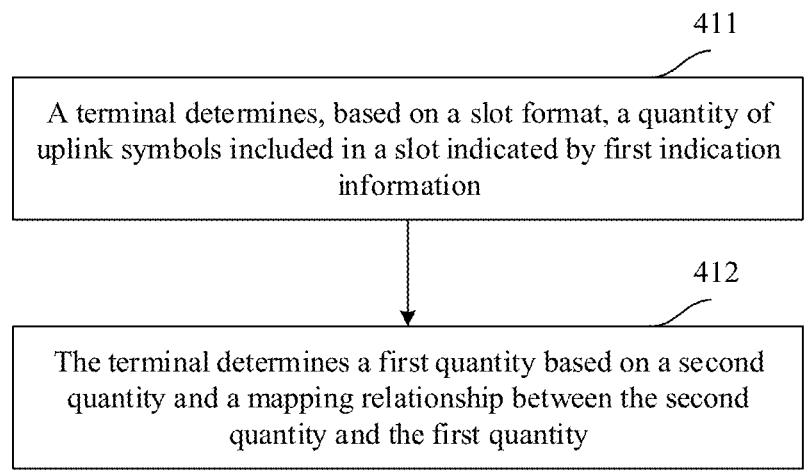
FIG. 5 is a third schematic flowchart of a resource determining method according to an embodiment of this application.

Optionally, step 41 may further include step 411 and step 412 shown in FIG. 5.

Step 411: The terminal determines, based on the slot format, a quantity of uplink symbols included in the slot indicated by the first indication information.

For example, if the second indication information includes the slot format number, the terminal may determine, based on the slot format number, whether each symbol in the slot is an uplink symbol, a downlink symbol, or an unknown symbol, and then determine the quantity of uplink symbols in the slot.

For ease of description, "second quantity" is used below to indicate the quantity of uplink symbols included in the slot.

Optionally, if the determined second quantity is greater than or equal to a preset threshold, step 412 continues to be performed. If the determined second quantity is less than or equal to a preset threshold, reliability of SA transmission may not be ensured, and the SA resources are no longer determined. In other words, the terminal cancels sending or receiving of the SA in the slot.

Step 412: The terminal determines the first quantity based on the second quantity and a mapping relationship between the second quantity and the first quantity.

The mapping relationship between the second quantity and the first quantity may be used to determine the first quantity based on the known second quantity. Optionally, the mapping relationship between the second quantity and the first quantity may be pre-agreed, or may be semi-statically configured by the base station.

In a possible implementation, a corresponding value of the first quantity may be preset for each value of the second quantity. Alternatively, a value range may be preset for the second quantity, and a corresponding value of the first quantity is set for each value range of the second quantity.

For example, one slot includes 14 symbols. The mapping relationship between the second quantity and the first quantity may be shown in Table 1.

TABLE 1

| Second quantity (x) | First quantity (y) |
| --- | --- |
| 14 | 2 |
| 7 < x < 14 | 3 |
| 7 | 4 |
| 3 < x < 7 | 6 |

Table 1 is used as an example. If the terminal determines, based on the slot format, that the slot indicated by the first indication information includes 14 uplink symbols, that is, all the symbols in the slot are used for uplink transmission, the quantity of RBs occupied by the SA in frequency domain may be the same as that in LTE, that is, two RBs are occupied in frequency domain. If the terminal determines, based on the slot format, that the slot includes seven uplink symbols, a quantity of time domain resources that can be used to send the SA and that are in the slot including only seven uplink symbols is half of a quantity of resources in LTE that are used to send the SA. Therefore, the quantity of RBs occupied by the SA resources in frequency domain can be doubled, that is, four RBs are occupied in frequency domain, so that a total quantity of RBs occupied by the SA is the same as that in the LTE. If the terminal determines, based on the slot format, that the quantity of uplink symbols included in the slot is less than or equal to 3, reliability of SA transmission may not be ensured. In this case, the terminal may cancel sending or receiving of the SA in the slot, that is, the preset threshold is 3.

It needs to be understood that values provided in Table 1 are merely examples, and specific values of the first quantity, the second quantity, and the preset threshold are not limited in the embodiments of this application. In addition, the total quantity of RBs occupied by the SA in the foregoing embodiment may alternatively be different from that in the LTE. This is not limited in this application.

In another possible implementation, the mapping relationship between the second quantity and the first quantity may alternatively be represented by using a mapping function. For example, when determining the second quantity and determining that the second quantity is greater than or equal to the preset threshold, the terminal determines the first quantity according to Formula (1):

$$y = \left\lfloor \frac{A}{x} \right\rfloor, \qquad (1)$$

where x represents the second quantity, y represents the first quantity, A is a constant, and $\lfloor \ \rfloor$ represents rounding down. Optionally, rounding down in the foregoing formula may be replaced by rounding up, or another manner such as rounding off may be used.

To make Formula (1) workable, x needs to be an integer greater than or equal to 1. That is, if x<1, the SA cannot be sent or received in the slot. Therefore, the preset threshold may be a value greater than or equal to 1. If the second quantity determined by the terminal is less than the preset threshold, the terminal cancels sending or receiving of the SA in the slot.

Figure 6:
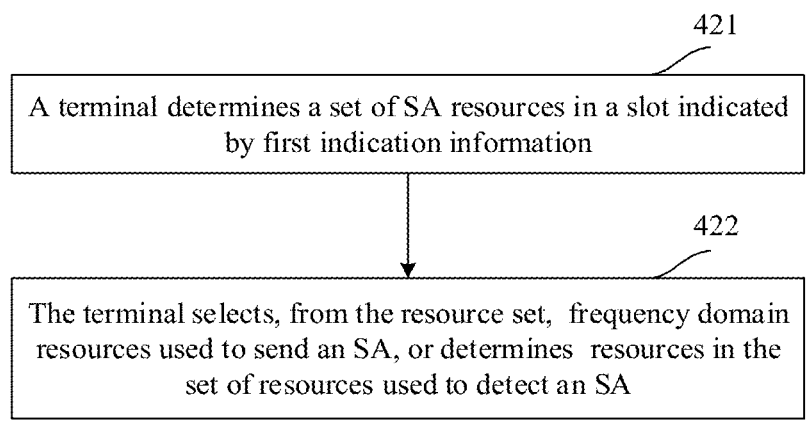
FIG. 6 is a fourth schematic flowchart of a resource determining method according to an embodiment of this application.

In a possible implementation, the base station indicates, to the terminal, only the time domain resources used to send or receive the SA. To be specific, the base station sends only the first indication information and the second indication information to the terminal, but does not indicate, to the terminal, the frequency domain resources used to send or receive the SA. In this case, step 42 may further include step 421 and step 422 shown in FIG. 6.

Step 421: The terminal determines a set of the SA resources in the slot indicated by the first indication information.

Step 422: The terminal selects, from the set of the SA resources, frequency domain resources used to send the SA, or determines resources in the set of the SA resources as resources used to detect the SA.

Because the base station does not indicate the frequency domain resources used by the terminal to send or receive the SA, the terminal may first determine a set of candidate resources that can be used to send or receive the SA in the slot; the transmit end then selects candidate resources from the candidate resource set and sends the SA; and the receive end may detect the SA on all determined candidate resources.

As described above, compared with a case in which all symbols in one slot are uplink symbols, if a quantity of uplink symbols is decreased, that is, a quantity of resources occupied by the SA in time domain is decreased, to ensure reliability of SA transmission, a quantity of resources occupied by the SA in frequency domain may be increased. When the quantity of resources occupied by the SA in frequency domain is increased, there are two implementations. In one implementation, a quantity of resources that can be occupied by the SA in frequency domain is increased, so that a maximum quantity of SAs that can be sent or received remains unchanged. In another implementation, frequency domain resources that that can be occupied by the SA remain unchanged, but a maximum quantity of SAs that can be sent or received is decreased. The following provides detailed descriptions with reference to FIG. 7(a) and FIG. 7(b) to FIG. 10(a) and FIG. 10(b).

Figures 7A, 7B:
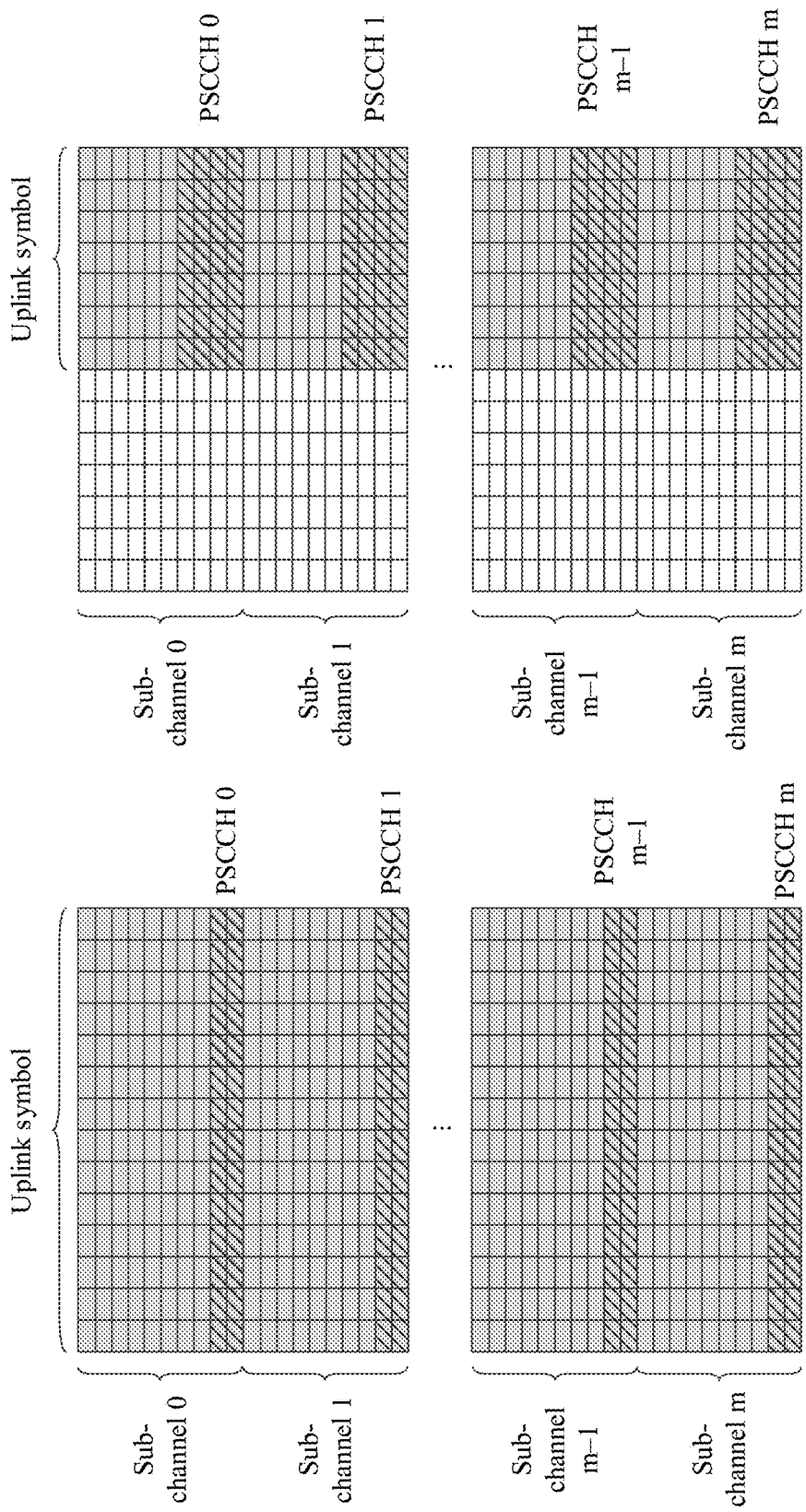
FIG. 7(a) and FIG. 7(b) are first schematic diagrams of SA resources according to an embodiment of this application.

Implementation 1:

If SA resources and resources of data scheduled by an SA are continuous in frequency domain, resource distribution is shown in FIG. 7(a). When it is ensured that the maximum quantity of SAs that can be sent or received remains unchanged, that is, when resources that can be occupied by the SA in frequency domain are variable, the SA resources may be shown in FIG. 7(b).

In the foregoing case, when determining the set of the SA resources, the terminal may determine, according to Formula (2), an RB included in $m^{th}$ available resources in the slot indicated by the first indication information:

$$n_{RB} = n_{CHRBstart} + m \times n_{CHsize}j, j=0,1,\ldots y-1 \quad (2)$$

where $n_{RB}$ represents a number of the RB in frequency domain, $n_{CHRBstart}$ represents a number of a starting RB of a sub-channel in frequency domain, $n_{CHsize}$ represents a quantity of RBs included in the sub-channel in frequency domain, m is an integer greater than or equal to 0, and y represents the first quantity.

Specifically, a relationship between a value range of m and a total quantity of RBs in frequency domain is as follows:

$$m_{max} = \frac{B}{n_{CHsize}}, \quad (3)$$

where $m_{max}$ represents a maximum value of m, and B represents the total quantity of RBs in frequency domain. For example, if the maximum value of m is 9, it indicates that m ∈{0, 1, 2, 3, 4, 5, 6, 7, 8, 9}. The terminal may substitute each optional value of m into Formula (2) based on the value range of m, to obtain candidate SA resources, so that a resource set including 10 candidate resources is obtained.

As shown in FIG. 7(b), to ensure that the maximum quantity of SAs that can be sent or received remains unchanged in frequency domain, in the sub-channel, a quantity of RBs that are occupied by the SA and a quantity of RBs that can be occupied by data may change with the first quantity. Regardless of the first quantity determined based on the slot format, the value range of m remains unchanged.

In some embodiments, a value of B is pre-agreed, or is sent by the base station to the terminal, and the terminal determines the value range of m according to Formula (3). In some other embodiments, the maximum value of m is pre-agreed, or is sent by the base station to the terminal.

It needs to be understood that although an example in which one slot includes 14 symbols, and seven of the 14 symbols are uplink symbols is used in FIG. 7(a) and FIG. 7(b), the foregoing embodiment is not limited to being applied to a scenario in which one slot includes 14 symbols, and is also applicable to a scenario in which one slot includes another quantity of symbols or another slot format.

Figures 8A, 8B:
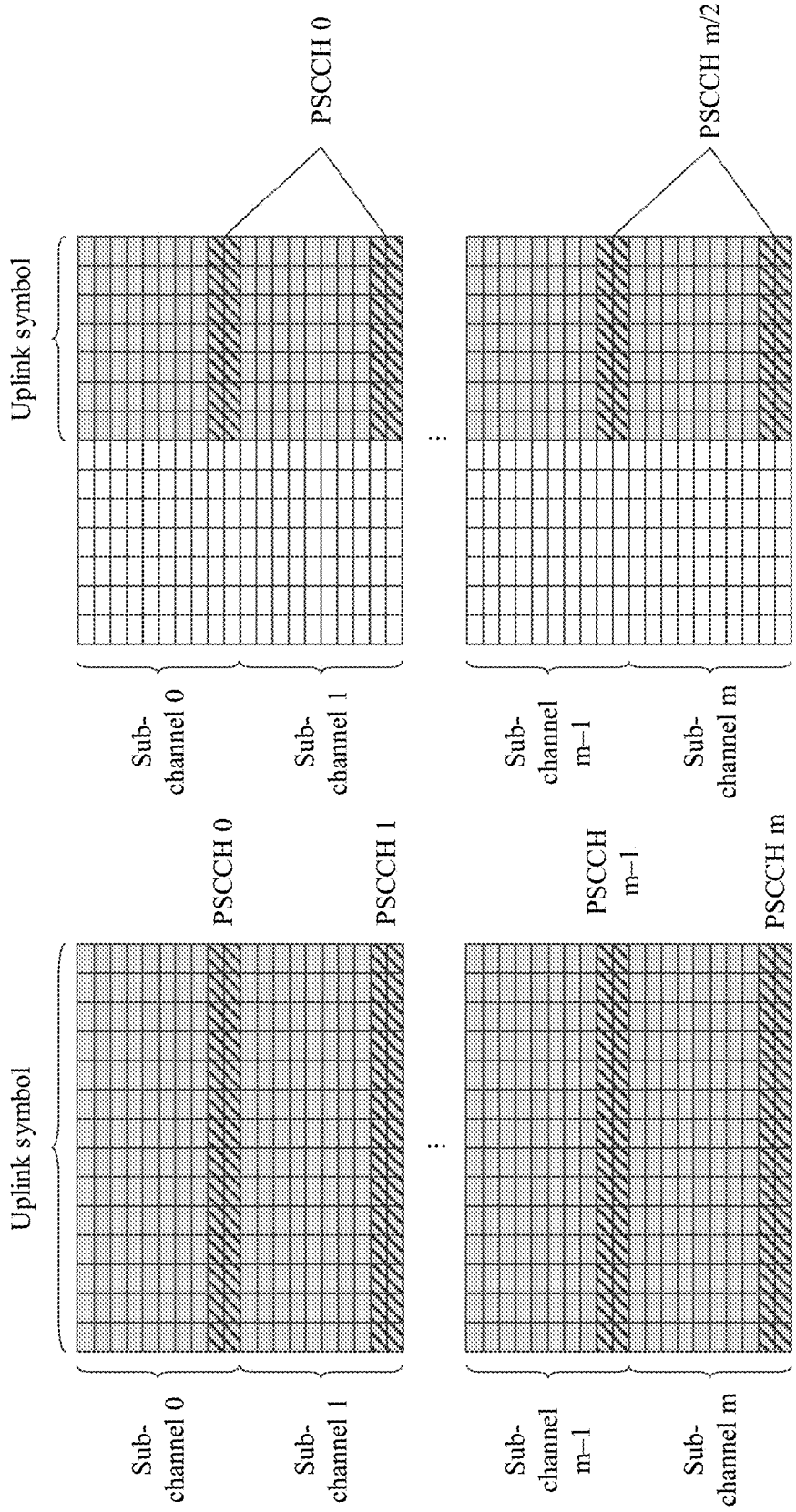
FIG. 8(a) and FIG. 8(b) are second schematic diagrams of SA resources according to an embodiment of this application.

Implementation 2:

If SA resources and resources of data scheduled by an SA are continuous in frequency domain, resource distribution is shown in FIG. 8(a). When a quantity of resources that can be occupied by the SA in frequency domain is not increased, that is, when the maximum quantity of SAs that can be sent or received is variable, the SA resources may be shown in FIG. 8(b).

As shown in FIG. 8(b), one slot includes 14 symbols, and seven of the 14 symbols are uplink symbols. In addition, it is determined, based on the mapping relationship between the second quantity and the first quantity, that the SA occupies four RBs in frequency domain. Because the quantity of uplink symbols is 7, the quantity of RBs occupied by the SA in frequency domain is twice the quantity of RBs occupied by the SA in frequency domain when all the symbols in the slot are uplink symbols. That is, the SA occupies, in frequency domain, RBs that are in two sub-channels and that can be used to send the SA. If the transmit end chooses to send the SA on resources that are in a sub-channel 0 and a sub-channel 1 and that can be used to transmit the SA, the receive end receives the SA on the resources that are in the sub-channel 0 and the sub-channel 1 and that can be used to transmit the SA, and receives, based on resources indicated by the SA, data sent by the transmit end.

Certainly, FIG. 8(b) shows only a special example of the embodiments of this application. To meet a condition that the quantity of resources that can be occupied by the SA in frequency domain is not increased, when determining the set of the SA resources, the terminal may determine, according to Formula (4), an RB included in $m^{th}$ available resources in the slot indicated by the first indication information:

$$n_{RB} = n_{CHRBstart} + n \times n_{CHsize} + j \quad (4)$$

$$n = k*m, k*m+1, \ldots, k*m+k-1, k = \left\lfloor \frac{y}{2} \right\rfloor$$

$$j = 0, 1,$$

where $n_{RB}$ represents a number of the RB in frequency domain, $n_{CHRBstart}$ represents a number of a starting RB of a sub-channel in frequency domain, $n_{CHsize}$ represents a quantity of RBs included in the sub-channel in frequency domain, m is an integer greater than or equal to 0, and y represents the first quantity. A method for determining a value range of m is similar to the determining method in Embodiment 1. Details are not described herein again.

In the foregoing embodiment, to avoid increasing the quantity of resources that can be occupied by the SA in frequency domain, a value range of n in Formula (4) changes with the first quantity, to be specific, a quantity of candidate SA resources included in the determined set of the SA resources changes with the first quantity.

Implementation 3:

If SA resources and resources of data scheduled by an SA are discontinuous in frequency domain, resource distribution is shown in FIG. 9(a). When it is ensured that the maximum quantity of SAs that can be sent or received remains unchanged, that is, when resources that can be occupied by the SA in frequency domain are variable, the SA resources may be shown in FIG. 9(b).

In the foregoing case, when determining the set of the SA resources, the terminal may determine, according to Formula (5), an RB included in $m^{th}$ available resources in the slot indicated by the first indication information:

$$n_{RB}=n_{PSCCHstart}+y \times m+j, \ j=0,1,\ldots y-1 \qquad (5),$$

where $n_{RB}$ represents a number of the RB in frequency domain, $n_{PSCCHstart}$ represents a number of a starting RB of resources that can be used to send or receive the SA, m is an integer greater than or equal to 0, and y represents the first quantity.

In the foregoing embodiment, it is ensured that the maximum quantity of SAs that can be sent or received remains unchanged. Therefore, regardless of the first quantity determined based on the slot format, a value range of m remains unchanged. A maximum value of m may be pre-agreed, or may be sent by the base station to the terminal.

Implementation 4:

If SA resources and resources of data scheduled by an SA are discontinuous in frequency domain, resource distribution is shown in FIG. 10(a). When a quantity of resources that can be occupied by the SA in frequency domain is not increased, that is, when the maximum quantity of SAs that can be sent or received is variable, the SA resources may be shown in FIG. 10(b).

In the foregoing case, when determining the set of the SA resources, the terminal may also determine, according to Formula (5), an RB included in $m^{th}$ available resource in the slot indicated by the first indication information.

However, a difference from Embodiment 3 is that a value range of m is not fixed, but changes with the first quantity. As shown in FIG. 10(a) and FIG. 10(b), when slot formats are different, the quantity of RBs that can be occupied by the SA in frequency domain remains unchanged, but the maximum quantity of SAs that can be sent or received, namely, a maximum value of m, changes with the first quantity.

Specifically, the value range of m is limited by a total quantity of frequency domain resources that can be occupied by the SA, that is:

$$m_{max}=\frac{c}{y}, \qquad (6)$$

where $m_{max}$ represents the maximum value of m, and C represents the quantity of RBs that can be used for the SA in frequency domain, and y represents the first quantity. In some embodiments, a value of B is pre-agreed, or is sent by the base station to the terminal, and the terminal determines the value range of m according to Formula (6).

Implementations 1 to 4 provide examples in which the terminal determines the set of the SA resources in different scenarios. After determining the set of the SA resources, the transmit end further needs to select, from the set of the SA resources, resources finally used to send the SA. For example, the terminal may randomly select the resources or select the resources according to a preset rule. The receive end determines resources in the set of the SA resources as resources used to detect the SA. For example, the terminal may perform blind detection on the determined resources in the set of the SA resources, to receive the SA sent by the transmit end.

In some other embodiments, the base station indicates the time domain resources to the terminal, and may further indicate the frequency domain resources to the terminal. For example, the base station may send the value of m in Implementations 1 to 4 to the terminal. The terminal determines, based on the value of m, the frequency domain resources used to send or receive the SA, and no longer needs to substitute each possible value of m into a formula to determine the set of the SA resources.

Based on a same technical concept, an embodiment of this application further provides a resource configuration method. In the method, a network device sends first indication information and second indication information to a terminal, where the first indication information is used to indicate a slot in which the terminal sends or receives a scheduling assignment SA, and the second indication information is used to indicate a slot format of the slot. According to the foregoing method, the terminal can determine SA resources based on the first indication information and the second indication information, that is, the terminal can perform the foregoing resource determining method embodiments.

In a possible implementation, in addition to indicating time domain resources used by the terminal to send or receive the SA, the network device may further indicate SA frequency domain resources. Specifically, the network device may determine the SA frequency domain resources in the slot based on the slot format, and send third indication information to the terminal, where the third indication information is used to indicate the determined SA frequency domain resources.

In a possible implementation, when determining the SA frequency domain resources based on the slot format, the network device may first determine a first quantity based on the slot format, where the first quantity is a quantity of resource blocks RBs occupied by the SA in frequency domain; and then determine the SA frequency domain resources in the slot based on the first quantity.

A method for determining a first quantity by a network device may be similar to the method for determining a first quantity by a terminal in the foregoing embodiment. The network device may first determine a second quantity based on the slot format, where the second quantity is a quantity of uplink symbols in the slot, and then determine the first quantity based on a mapping relationship between the second quantity and the first quantity. Optionally, the network device further determines the first quantity only when the determined second quantity is greater than or equal to a preset threshold.

Specifically, a process in which the network device determines the first quantity based on the mapping relationship between the second quantity and the first quantity may be the same as the foregoing method of determining the first quantity by the terminal. Details are not described herein again.

In a possible implementation, the third indication information sent by the network device may be used to indicate that the SA frequency domain resources are $m^{th}$ available resources in the slot. Specifically, an RB included in the $m^{th}$ available resources may be the same as that described in Implementations 1 to 4 in which the terminal determines the SA frequency domain resources. The network device sends a value of m to the terminal, so that the terminal determines, based on the value of m, an RB used to send or receive the SA, and does not need to calculate a set of resources that can be used to send or receive the SA.

In a possible implementation, the mapping relationship between the second quantity and the first quantity is pre-agreed, or is semi-statically configured by the network device.

Figure 11:
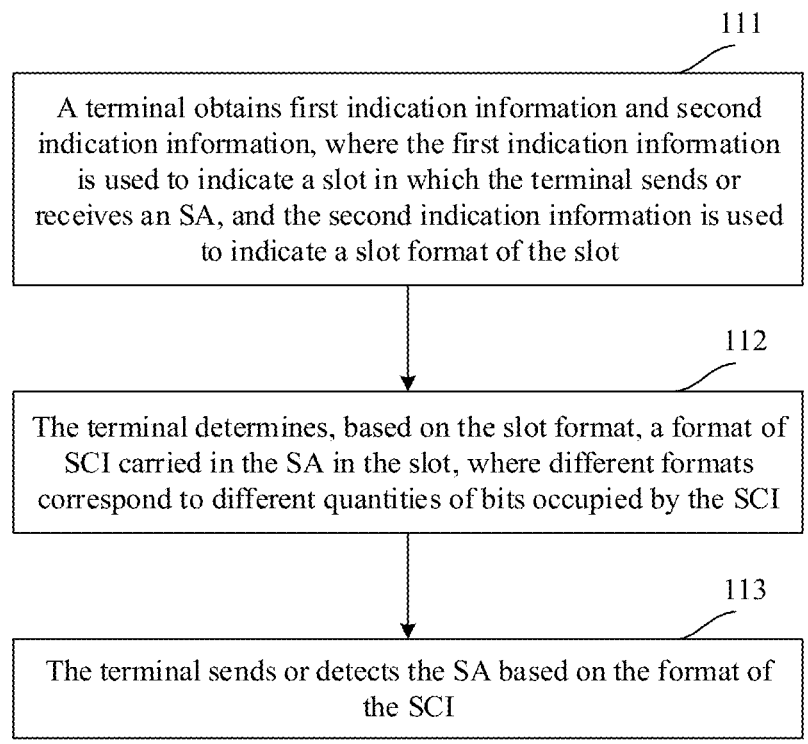
FIG. 11 is a fifth schematic flowchart of a resource determining method according to an embodiment of this application.

To resolve a problem of sending or receiving an SA in a scenario in which a slot is flexible and variable, an embodiment of this application further provides a resource determining method. The method may include steps shown in FIG. 11.

Step 111: A terminal obtains first indication information and second indication information.

The first indication information is used to indicate a slot in which the terminal sends or receives an SA, and the second indication information is used to indicate a slot format of the slot.

As described above, the first indication information may be DCI, and the second indication information may be SFI.

Step 112: The terminal determines, based on the slot format, a format of SCI carried in the SA in the slot. Different formats correspond to different quantities of bits occupied by the SCI.

Specifically, the SCI carried in the SA is used to indicate a position of resources occupied by data scheduled by the SA.

Step 113: The terminal sends or detects the SA based on the format of the SCI.

In the foregoing method, a method for determining, by a terminal based on a slot indicated by a base station and a slot format, time domain resources and frequency domain resources that are used to send or receive an SA may be similar to that in the prior art. However, different slot formats may indicate different determined total quantities of RBs occupied by resources for the SA. To ensure that all the resources including different determined quantities of RBs can be used to send the SA, the SCI carried in the SA may occupy different quantities of bits.

In a possible implementation, when determining the format of the SCI in the SA based on the slot format, the terminal may first determine a quantity of uplink symbols in the slot based on the slot format, and then determine, based on the quantity of uplink symbols, the quantity of bits occupied by the SCI in the SA sent in the slot. In this embodiment, the quantity of bits occupied by the SCI is related to the quantity of uplink symbols in the slot. For example, a relatively large quantity of uplink symbols in the slot indicates a relatively large quantity of bits occupied by the SCI; or a relatively small quantity of uplink symbols in the slot indicates a relatively small quantity of bits occupied by the SCI.

Optionally, different quantities of bits occupied by the SCI may indicate different granularities of data resources scheduled by the SCI. For example, if the SCI occupies a relatively large quantity of bits, the data resources may be scheduled in a unit of an RB; or if the SCI occupies a relatively small quantity of bits, the data resources may be scheduled in a unit of four RBs.

During communication between the terminals, both a receive end and a transmit end can determine the format of the SCI in the SA by using the foregoing method, to send or detect the SA based on the format of the SCI.

Figure 12:
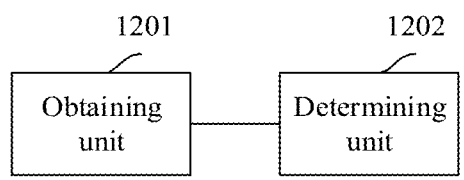
FIG. 12 is a first schematic structural diagram of a communications device according to an embodiment of this application.

Based on a same technical concept, an embodiment of this application further provides a communications device, configured to implement the function performed by the terminal in the foregoing method embodiments. Specifically, a structure of the communications device may be shown in FIG. 12. The communications device includes an obtaining unit 1201 and a determining unit 1202.

The obtaining unit 1201 is configured to obtain first indication information and second indication information, where the first indication information is used to indicate a slot in which a terminal sends or receives a scheduling assignment SA, and the second indication information is used to indicate a slot format of the slot.

The determining unit 1202 is configured to determine SA resources in the slot based on the slot format.

Optionally, the determining unit 1202 is specifically configured to determine an SA frequency domain resources in the slot based on the slot format.

Optionally, the determining unit 1202 is specifically configured to: determine a first quantity based on the slot format, where the first quantity is a quantity of resource blocks RBs occupied by the SA in frequency domain; and determine the SA frequency domain resources in the slot based on the first quantity.

Optionally, the determining unit 1202 is specifically configured to: determine a second quantity based on the slot format, where the second quantity is a quantity of uplink symbols in the slot; and determine the first quantity based on a mapping relationship between the second quantity and the first quantity.

Optionally, the determining unit 1202 is specifically configured to: if the second quantity is greater than or equal to a preset threshold, determine resources used to transmit the SA in the slot.

Optionally, the determining unit 1202 is specifically configured to: if the second quantity is greater than or equal to the preset threshold, determine the first quantity according to Formula (1).

Optionally, the determining unit 1202 is specifically configured to: determine a set of the SA resources in the slot; and select, from the set of the SA resources, a frequency domain resources used to send the SA, or determine resources in the set of the SA resources as a resources used to detect the SA.

Optionally, the determining unit 1202 is specifically configured to determine, according to Formula (2), Formula (4), or Formula (5), an RB included in $m^{th}$ available resources in a candidate SA set.

Optionally, the obtaining unit 1201 is further configured to obtain third indication information, where the third indication information is used to indicate that the SA frequency domain resources are $m^{th}$ available resources in the slot. The terminal may determine, according to Formula (2), Formula (4), or Formula (5), an RB included in the $m^{th}$ available resources in the slot.

Optionally, the mapping relationship is pre-agreed, or is semi-statically configured by a network device.

Figure 13:
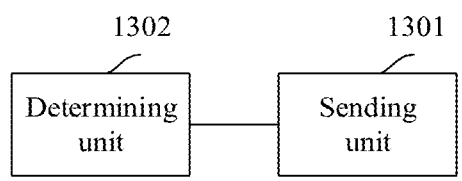
FIG. 13 is a second schematic structural diagram of a communications device according to an embodiment of this application.

Based on a same technical concept, an embodiment of this application further provides a communications device, configured to implement the function performed by the network device in the foregoing method embodiments. Specifically, a structure of the communications device may be shown in FIG. 13. The communications device includes a sending unit 1301, and may further include a determining unit 1302.

The sending unit 1301 is configured to send first indication information and second indication information, where the first indication information is used to indicate a slot in which a terminal sends or receives a scheduling assignment SA, and the second indication information is used to indicate a slot format of the slot, so that the terminal determines SA resources in the slot based on the slot format.

Optionally, the determining unit 1302 is configured to determine SA frequency domain resources in the slot based on the slot format. The sending unit 1301 is further configured to send third indication information to the terminal, where the third indication information is used to indicate the determined SA frequency domain resources.

Optionally, the determining unit 1302 is specifically configured to: determine a first quantity based on the slot format, where the first quantity is a quantity of resource blocks RBs occupied by the SA in frequency domain; and determine the SA frequency domain resources in the slot based on the first quantity.

Optionally, the determining unit 1302 is specifically configured to: determine a second quantity based on the slot format, where the second quantity is a quantity of uplink symbols in the slot; and determine the first quantity based on a mapping relationship between the second quantity and the first quantity.

Optionally, the determining unit 1302 is specifically configured to: if the second quantity is greater than or equal to a preset threshold, determine the first quantity according to Formula (1).

Optionally, the third indication information is used to indicate that the SA frequency domain resources are $m^{th}$ available resources in the slot, and an RB included in the $m^{th}$ available resources may be shown in Formula (2).

Optionally, the third indication information is used to indicate that the SA frequency domain resources are $m^{th}$ available resources in the slot, and an RB included in the $m^{th}$ available resources may be shown in Formula (4).

Optionally, the third indication information is used to indicate that the SA frequency domain resources are $m^{th}$ available resources in the slot, and an RB included in the $m^{th}$ available resources may be shown in Formula (5).

Optionally, the sending unit 1301 is further configured to send the mapping relationship between the second quantity and the first quantity to the terminal.

Figure 14A:
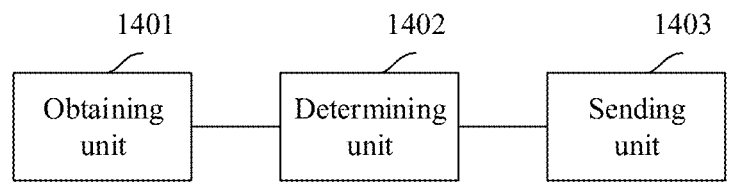
FIG. 14(a) and FIG. 14(b) are third schematic structural diagrams of a communications device according to an embodiment of this application.
Figure 14B:
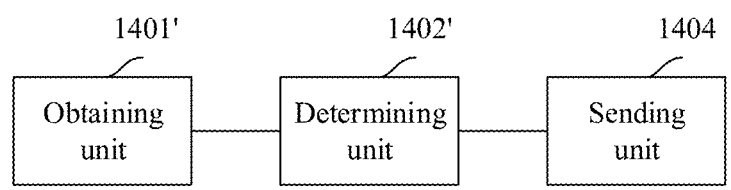

Based on a same technical concept, an embodiment of this application further provides a communications device, configured to implement the function performed by the terminal in the foregoing method embodiments. Specifically, a structure of the communications device may be shown in FIG. 14(a) or FIG. 14(b). FIG. 14(a) may show a structure of a transmit end, and the transmit end includes an obtaining unit 1401, a determining unit 1402, and a sending unit 1403. FIG. 14(b) may show a structure of a receive end, and the receive end includes an obtaining unit 1401', a determining unit 1402', and a sending unit 1404.

Both the obtaining unit 1401 and the obtaining unit 1401' may be configured to obtain first indication information and second indication information, where the first indication information is used to indicate a slot in which a terminal sends or receives an SA, and the second indication information is used to indicate a slot format of the slot.

Both the determining unit 1402 and the determining unit 1402' may be configured to determine, based on the slot format, a format of SCI carried in the SA in the slot. Different formats correspond to different quantities of bits occupied by the SCI.

The sending unit 1403 is configured to send the SA based on the format of the SCI.

The sending unit 1404 is configured to detect the SA based on the format of the SCI.

Optionally, the determining unit 1402 and the determining unit 1402' are specifically configured to: determine a quantity of uplink symbols in the slot based on the slot format; and then determine, based on the quantity of uplink symbols, the format of the SCI carried in the SA transmitted in the slot.

It needs to be understood that, division of the units of the network device is merely logical function division. During actual implementation, the units may be all or partially integrated into a physical entity, or may be physically separated. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be an independently disposed processing element, or may be integrated into a chip of the network device for implementation. In addition, the sending unit may be alternatively stored in a memory of the network device in a form of a program, and a processing element of the network device invokes and executes a function of the sending unit. Implementation of other units is similar. In addition, some or all of the units may be integrated together, or the units may be implemented independently. Herein, the processing element may be an integrated circuit and has a signal processing capability. In an implementation process, steps in the foregoing method or the foregoing units may be implemented by using a hardware integrated logical circuit in the processing element, or by using an instruction in a form of software. In addition, the sending unit is a sending control unit, and may send information through a sending apparatus of the network device, for example, an antenna and a radio frequency apparatus.

The foregoing units may be configured as one or more integrated circuits for implementing the foregoing method, for example, one or more application-specific integrated circuits (ASIC); or may be configured as one or more microprocessors (digital signal processor, DSP), one or more field programmable gate arrays (FPGA), or the like. For another example, when one of the units is implemented in a form of a program invoked by the processing element, the processing element may be a general-purpose processor, for example, a central processing unit (CPU) or another processor that can invoke a program. For still another example, the units may be integrated and implemented in a form of a system on a chip (SOC).

Figure 15:
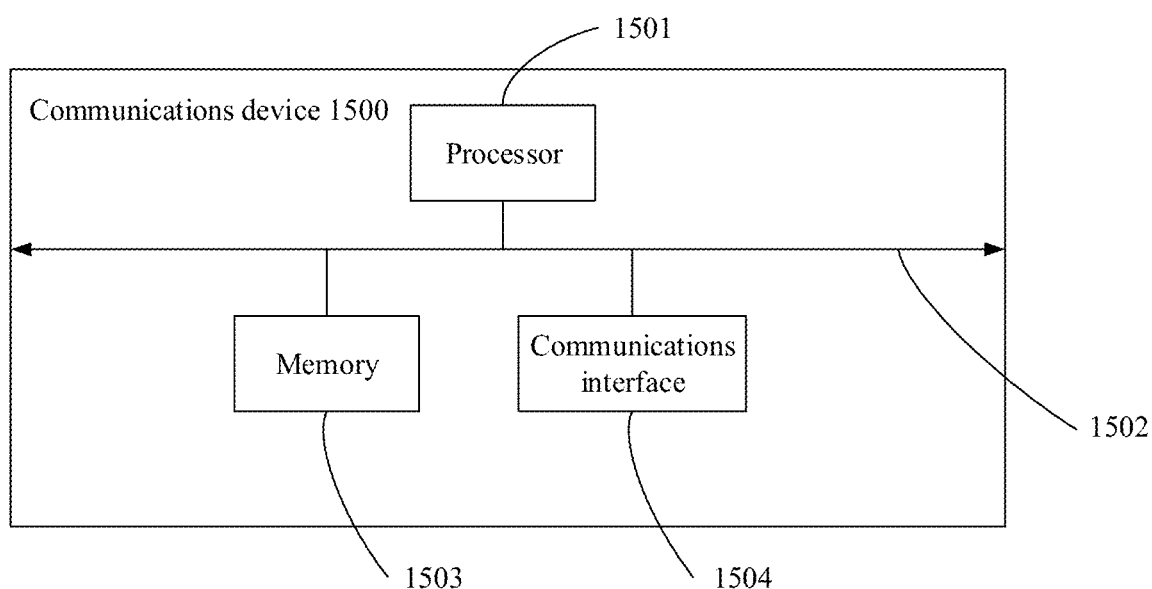
FIG. 15 is a first schematic diagram of a hardware structure of a communications device according to an embodiment of this application.

Based on a same technical concept, an embodiment of this application provides a communications device 1500, configured to implement a function performed by the terminal in the foregoing method embodiments. Specifically, a hardware structure of the communications device 1500 may be shown in FIG. 15, and includes at least one processor 1501, a communications bus 1502, a memory 1503, and at least one communications interface 1504.

The processor 1501 may be a general-purpose central processing unit (CPU), a microprocessor, an application-specific integrated circuit (ASIC), or one or more integrated circuits configured to control program execution of the solutions of this application.

The communications bus 1502 may include a path, to transmit information between the foregoing components.

The communications interface 1504 uses any apparatus such as a transceiver, and is configured to communicate with another device or a communications network, such as the Ethernet, a radio access network (RAN), or a wireless local area network (WLAN).

The memory 1503 may be a read-only memory (ROM) or another type of static storage device that can store static information and a static instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer. However, the memory 1503 is not limited thereto. The memory may exist independently, and is connected to the processor through a bus. Alternatively, the memory may be integrated with the processor.

The memory 1503 is configured to store application program code used to execute the solutions of this application, and the processor 1501 controls execution of the application program code. The processor 1501 is configured to execute the application program code stored in the memory 1503, to implement the resource determining method according to the embodiments of this application.

Alternatively, optionally, in the embodiments of this application, the processor 1501 may perform a related function in the resource determining method according to the embodiments of this application, and the communications interface 1504 is responsible for communication with another device or a communications network. This is not specifically limited in the embodiments of this application.

During specific implementation, in an embodiment, the processor 1501 may include one or more CPUs.

During specific implementation, in an embodiment, the communications device may include a plurality of processors. Each of the processors may be a single-core (single-CPU) processor or a multi-core (multi-CPU) processor. Herein, the processor may refer to one or more devices, circuits, and/or processing cores configured to process data (for example, a computer program instruction).

Figure 16:
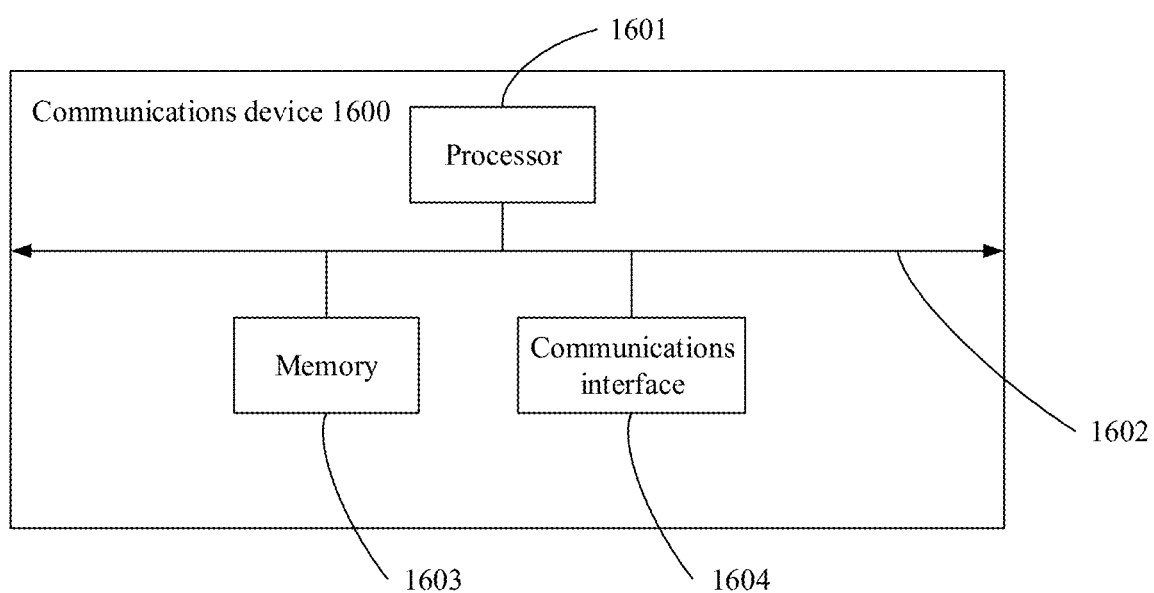
FIG. 16 is a second schematic diagram of a hardware structure of a communications device according to an embodiment of this application.

Based on a same technical concept, an embodiment of this application further provides a communications device 1600, configured to implement a function performed by the network device in the foregoing method embodiments. Specifically, a hardware structure of the communications device 1600 may be shown in FIG. 16, and includes at least one processor 1601, a communications bus 1602, a memory 1603, and at least one communications interface 1604.

The processor 1601 may be a CPU, a microprocessor, an ASIC, or one or more integrated circuits configured to control program execution of the solutions of this application.

The communications bus 1602 may include a path, to transmit information between the foregoing components.

The communications interface 1604 uses any apparatus such as a transceiver, and is configured to communicate with another device or a communications network, such as the Ethernet, a radio access network (RAN), or a wireless local area network (WLAN).

The memory 1603 may be a ROM or another type of static storage device that can store static information and a static instruction, or a RAM or another type of dynamic storage device that can store information and an instruction, or may be an EEPROM, a CD-ROM or another compact disc storage, an optical disc storage, a magnetic disk storage medium or another magnetic storage device, or any other medium that can be used to carry or store expected program code in a form of an instruction or a data structure and that can be accessed by a computer. However, the memory 1603 is not limited thereto. The memory may exist independently, and is connected to the processor through a bus. Alternatively, the memory may be integrated with the processor.

The memory 1603 is configured to store application program code used to execute the solutions of this application, and the processor 1601 controls execution of the application program code. The processor 1601 is configured to execute the application program code stored in the memory 1603, to implement the resource configuration method according to the embodiments of this application.

Alternatively, optionally, in the embodiments of this application, the processor 1601 may perform a related function in the resource configuration method according to the embodiments of this application, and the communications interface 1604 is responsible for communication with another device or a communications network. This is not specifically limited in the embodiments of this application.

During specific implementation, in an embodiment, the processor 1601 may include one or more CPUs.

During specific implementation, in an embodiment, the communications device may include a plurality of processors. Each of the processors may be a single-core processor, or may be a multi-core processor. Herein, the processor may refer to one or more devices, circuits, and/or processing cores configured to process data (for example, a computer program instruction).

Based on a same technical concept, an embodiment of this application further provides a communications system, including the communications device 1500 and the communications device 1600.

Based on a same technical concept, an embodiment of this application further provides a chip system. The chip system includes a processor, configured to support a communications device in implementing the foregoing resource determining method or resource configuration method, for example, determining SA resources. In a possible design, the chip system further includes a memory. The memory is configured to store a program instruction and data necessary for the communications device. The chip system may include a chip, or may include a chip and another discrete device. This is not specifically limited in the embodiments of this application.

All or some of the foregoing embodiments may be implemented by using software, hardware, firmware, or any combination thereof. When a software program is used for implementation, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or another programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A resource determining method, comprising:
obtaining, by a terminal, first indication information and second indication information, wherein the first indication information is used to indicate a slot in which the terminal sends or receives a scheduling assignment (SA), and the second indication information is used to indicate a slot format of the slot; and
determining, by the terminal, SA resources in the slot based on the slot format.

2. The method according to claim 1, wherein the determining, by the terminal, SA resources in the slot based on the slot format comprises:
determining, by the terminal, SA frequency domain resources in the slot based on the slot format.

3. The method according to claim 2, wherein the determining, by the terminal, SA frequency domain resources in the slot based on the slot format comprises:
determining, by the terminal, a first quantity based on the slot format, wherein the first quantity is a quantity of resource blocks (RBs) occupied by the SA in a frequency domain; and
determining, by the terminal, the SA frequency domain resources in the slot based on the first quantity.

4. The method according to claim 3, wherein the determining, by the terminal, a first quantity based on the slot format comprises:
determining, by the terminal, a second quantity based on the slot format, wherein the second quantity is a quantity of uplink symbols in the slot; and
determining, by the terminal, the first quantity based on a mapping relationship between the second quantity and the first quantity.

5. The method according to claim 4, wherein the determining, by the terminal, the first quantity based on a mapping relationship between the second quantity and the first quantity comprises:
when the second quantity is greater than or equal to a preset threshold value, determining the first quantity according to the following formula:

$$y = \left\lfloor \frac{A}{x} \right\rfloor,$$

wherein
x represents the second quantity, y represents the first quantity, A is a constant, and $\lfloor \ \rfloor$ represents rounding down.

6. The method according to claim 3, wherein the determining the SA frequency domain resources in the slot comprises:
determining, by the terminal, a set of the SA resources in the slot; and
selecting, by the terminal from the set of the SA resources, frequency domain resources used to send the SA, or determining, by the terminal, resources in the set of the SA resources as resources used to detect the SA.

7. The method according to claim 6, wherein the determining, by the terminal, a set of the SA resources in the slot comprises:
determining, by the terminal, an RB comprised in $m^{th}$ available resources in the slot according to the following formula:

$$n_{RB} = n_{CHRBstart} + m \times n_{CHsize} + j, j=0,1, \ldots y-1,$$

wherein $n_{RB}$ represents a number of the RB in the frequency domain, $n_{CHRBstart}$ represents a number of a starting RB of a sub-channel in the frequency domain, $n_{CHsize}$ represents a quantity of RBs comprised in the sub-channel in the frequency domain, m is an integer greater than or equal to 0, and y represents the first quantity.

8. The method according to claim 6, wherein the determining, by the terminal, a set of the SA resources in the slot comprises:
determining, by the terminal, an RB comprised in $m^{th}$ available resources in the slot according to the following formula:

$$n_{RB} = n_{CHRBstart} + n \times n_{CHsize} + j$$
$$n = k*m, k*m+1, \ldots, k*m+k-1, k = \left\lfloor \frac{y}{2} \right\rfloor$$
$$j = 0, 1,$$

wherein
$n_{RB}$ represents a number of the RB in the frequency domain, $n_{CHRBstart}$ represents a number of a starting RB of a sub-channel in the frequency domain, $n_{CHsize}$ represents a quantity of RBs comprised in the sub-channel in the frequency domain, m is an integer greater than or equal to 0, and y represents the first quantity.

9. The method according to claim 6, wherein the determining, by the terminal, a set of the SA resources in the slot comprises:
determining, by the terminal, an RB comprised in $m^{th}$ available resources in the slot according to the following formula:

$$n_{RB} = n_{PSCCHstart} + y \times m + j, j=0,1, \ldots y-1, \text{ wherein}$$

$n_{RB}$ represents a number of the RB in the frequency domain, $n_{PSCCHstart}$ represents a number of a starting RB of resources that can be used to transmit the SA, m is an integer greater than or equal to 0, and y represents the first quantity.

10. The method according to claim 3, further comprising:
obtaining, by the terminal, third indication information, wherein the third indication information is used to indicate that the SA frequency domain resources are $m^{th}$ available resources in the slot; and determining, by the terminal, an RB comprised in the $m^{th}$ available resources in the slot according to one of the following formulas:

$$n_{RB} = n_{CHRBstart} + m \times n_{CHsize} + j, \, j = 0, 1, \ldots y-1; \text{ or}$$

$$n_{RB} = n_{CHRBstart} + n \times n_{CHsize} + j,$$

$$n = k*m, k*m+1, \ldots, k*m+k-1, k = \left\lfloor \frac{y}{2} \right\rfloor, j = 0, 1; \text{ or}$$

$$n_{RB} = n_{PSCCHstart} + y \times m + j, \, j = 0, 1, \ldots y-1,$$

wherein $n_{RB}$ represents a number of the RB in the frequency domain, $n_{PSCCHstart}$ represents a number of a starting RB of resources that can be used to transmit the SA, $n_{CHsize}$ represents a quantity of RBs comprised in a sub-channel in the frequency domain, and y represents the first quantity.

11. The method according to claim 3, wherein the determining, by the terminal, SA resources in the slot based on the slot format comprises:

when the quantity of uplink symbols in the slot is greater than or equal to a preset threshold value, determining, by the terminal, the resources used to transmit the SA in the slot.

12. A resource configuration method, comprising:

sending, by a network device, first indication information and second indication information, wherein the first indication information is used to indicate a slot in which a terminal sends or receives a scheduling assignment (SA), and the second indication information is used to indicate a slot format of the slot, to enable the terminal to determine SA resources in the slot based on the slot format.

13. The method according to claim 12, further comprising:

determining, by the network device, SA frequency domain resources in the slot based on the slot format; and sending, by the network device, third indication information to the terminal, wherein the third indication information is used to indicate the determined SA frequency domain resources.

14. A communications device, comprising a processor, a memory, and a communications interface, wherein the memory is configured to store a program, and the processor invokes the program stored in the memory to perform:

obtaining first indication information and second indication information, wherein the first indication information is used to indicate a slot in which the communications device sends or receives a scheduling assignment (SA), and the second indication information is used to indicate a slot format of the slot; and determining SA resources in the slot based on the slot format.

15. The communications device according to claim 14, wherein the determining SA resources in the slot based on the slot format, comprises:

determining SA frequency domain resources in the slot based on the slot format.

16. The communications device according to claim 15, wherein the determining SA frequency domain resources in the slot based on the slot format, comprises:

determining a first quantity based on the slot format, wherein the first quantity is a quantity of resource blocks (RBs) occupied by the SA in a frequency domain; and determining the SA frequency domain resources in the slot based on the first quantity.

17. The communications device according to claim 16, wherein the determining the SA frequency domain resources in the slot based on the first quantity, comprises:

determining a second quantity based on the slot format, wherein the second quantity is a quantity of uplink symbols in the slot; and determining the first quantity based on a mapping relationship between the second quantity and the first quantity.

18. The communications device according to claim 17, wherein the determining the first quantity based on a mapping relationship between the second quantity and the first quantity, comprises:

when the second quantity is greater than or equal to a preset threshold value, determining the first quantity according to the following formula:

$$y = \left\lfloor \frac{A}{x} \right\rfloor,$$

wherein x represents the second quantity, y represents the first quantity, A is a constant, and $\lfloor \, \rfloor$ represents rounding down.

19. A communications device, comprising a processor, a memory, and a communications interface, wherein the memory is configured to store a program, and the processor invokes the program stored in the memory to perform:

sending first indication information and second indication information, wherein the first indication information is used to indicate a slot in which a terminal sends or receives a scheduling assignment (SA), and the second indication information is used to indicate a slot format of the slot, to enable the terminal to determine SA resources in the slot based on the slot format.

20. The communications device according to claim 19, wherein the processor invokes the program stored in the memory to perform:

determining SA frequency domain resources in the slot based on the slot format; and sending third indication information to the terminal, wherein the third indication information is used to indicate the determined SA frequency domain resources.

* * * * *